(12) United States Patent
Maeda et al.

(10) Patent No.: US 10,766,068 B2
(45) Date of Patent: Sep. 8, 2020

(54) DIE-CASTING SLEEVE AND ITS PRODUCTION METHOD

(71) Applicant: HITACHI METALS, LTD., Tokyo (JP)

(72) Inventors: Nagato Maeda, Kitakyusyu (JP); Eisuke Ogawa, Kitakyusyu (JP)

(73) Assignee: HITACHI METALS, LTD., Tokyo (JP)

( * ) Notice: Subject to any disclaimer, the term of this patent is extended or adjusted under 35 U.S.C. 154(b) by 92 days.

(21) Appl. No.: 16/077,104

(22) PCT Filed: Sep. 23, 2016

(86) PCT No.: PCT/JP2016/078079
§ 371 (c)(1),
(2) Date: Aug. 10, 2018

(87) PCT Pub. No.: WO2017/141480
PCT Pub. Date: Aug. 24, 2017

(65) Prior Publication Data
US 2019/0060988 A1 Feb. 28, 2019

(30) Foreign Application Priority Data
Feb. 15, 2016 (JP) .................................. 2016-026317

(51) Int. Cl.
*B22D 17/20* (2006.01)
*C22C 38/40* (2006.01)
(Continued)

(52) U.S. Cl.
CPC ......... *B22D 17/2023* (2013.01); *B22D 17/20* (2013.01); *B23K 9/042* (2013.01);
(Continued)

(58) Field of Classification Search
CPC .......................... B22D 17/20; B22D 17/2023
See application file for complete search history.

(56) References Cited

U.S. PATENT DOCUMENTS

| 5,323,838 A | 6/1994 | Hamashima et al. |
| 2016/0038999 A1 | 2/2016 | Bochiechio et al. |

FOREIGN PATENT DOCUMENTS

| JP | 06-71406 A | 3/1994 |
| JP | 07-246449 A | 9/1995 |
| (Continued) | | |

OTHER PUBLICATIONS

International Search Report of PCT/JP2016/078079 filed Dec. 6, 2016.

*Primary Examiner* — Kevin P Kerns
*Assistant Examiner* — Steven S Ha
(74) *Attorney, Agent, or Firm* — Sughrue Mion, PLLC

(57) ABSTRACT

A die-casting sleeve comprising an outer cylinder made of a low-thermal-expansion metal material, and an inner cylinder shrink-fit into the outer cylinder; an outer peripheral surface of the outer cylinder being provided with a flange for fixing the die-casting sleeve to a stationary die block of a die-casting machine; the inner cylinder being constituted by a front member of a low-thermal-expansion metal material arranged on the injection opening side, and a rear member of silicon-nitride-based ceramics arranged in close contact with a rear end surface of the front member; the outer cylinder having an average thermal expansion coefficient $\alpha_A$ of $1\times10^{-6}/°$ C. to $5\times10^{-6}/°$ C. between 20° C. and 200° C.; the front member having an average thermal expansion coefficient $\alpha_B$ of $1\times10^{-6}/°$ C. to $5\times10^{-6}/°$ C. between 20° C. and 200° C.; the difference between $\alpha_A$ and $\alpha_B$ being $-1\times10^{-6}/°$ C. to $1\times10^{-6}/°$ C.; and the axial length $L_1$ (mm) and inner diameter $D_{in}$ (mm) of the front member, and the (Continued)

distance $L_2$ (mm) from a tip end of the outer cylinder to a rear end of the flange meeting $\frac{1}{3} \times D_{in} \leq L_1 \leq L_2 + 20$.

12 Claims, 4 Drawing Sheets

(51) Int. Cl.
  *C22C 38/14* (2006.01)
  *C22C 38/52* (2006.01)
  *C22C 38/00* (2006.01)
  *B23K 9/04* (2006.01)
  *B23P 11/02* (2006.01)
  *C22C 30/00* (2006.01)

(52) U.S. Cl.
  CPC ............ *B23P 11/027* (2013.01); *C22C 30/00* (2013.01); *C22C 38/00* (2013.01); *C22C 38/14* (2013.01); *C22C 38/40* (2013.01); *C22C 38/52* (2013.01)

(56) References Cited

FOREIGN PATENT DOCUMENTS

| | | |
|---|---|---|
| JP | 2002-192320 A | 7/2002 |
| JP | 2009-195935 A | 9/2009 |
| JP | 2015-166109 A | 9/2015 |
| WO | 2014/164593 A1 | 10/2014 |

DIE-CASTING SLEEVE AND ITS PRODUCTION METHOD

This application is a National Stage of International Application No. PCT/JP2016/078079 filed Sep. 23, 2016, claiming priority based on Japanese Patent Application No. 2016-026317 filed Feb. 15, 2016.

FIELD OF THE INVENTION

The present invention relates to a die-casting sleeve for injecting a melt of a non-iron metal such as an aluminum alloy, etc. into a die-casting die, and a method for producing a die-casting sleeve.

BACKGROUND OF THE INVENTION

In a die-casting machine, a molten metal (melt) supplied to a sleeve is injected into a die cavity communicating with the sleeve by a plunger tip slidably movable in the sleeve, and solidified by cooling to produce a die-cast article. Accordingly, an inner surface of the sleeve is eroded by the melt, and worn by sliding with the plunger tip. When the inner surface of the sleeve is damaged by erosion and wear, a melt enters a gap between the sleeve and the plunger tip, and solidifies to increase the sliding resistance of the sleeve, resulting in a low injection speed and thus poor product quality. When a large amount of a lubricant is used to reduce sliding resistance between the sleeve and the plunger tip and to prevent seizure, the introduction of impurities such as a gas into the melt likely occurs, resulting in low product quality.

Proposed to reduce the erosion and wear of an inner surface of a sleeve is a die-casting sleeve having a composite structure, in which a ceramic-made inner cylinder is shrink-fit into a conventional outer cylinder made of a high-strength, low-thermal-expansion metal material. For example, JP 7-246449 A (Patent Reference 1) discloses a die-casting sleeve comprising an inner cylinder made of ceramics such as silicon nitride, sialon, etc. shrink-fit into an outer cylinder made of a high-strength, low-thermal-expansion metal material; the high-strength, low-thermal-expansion metal material having an average thermal expansion coefficient of $1\times10^{-6}/°$ C. to $5\times10^{-6}/°$ C. between room temperature and 300° C., and $5\times10^{-6}/°$ C. or more between room temperature and 600° C. This die-casting sleeve is provided at both ends of the outer cylinder with fixing rings made of hot work tool steel, and the inner cylinder is axially held by the fixing rings. Patent Reference 1 describes that with a high-strength, low-thermal-expansion metal material having such an average thermal expansion coefficient, sufficient shrink fitting can be conducted easily, without axial and circumferential displacement of the inner and outer cylinders.

In the die-casting sleeve of Patent Reference 1, however, when the fixing ring disposed in an injection-opening-side tip portion is not sufficiently cooled, for example, an inherently brittle ceramic-made inner cylinder in the injection-opening-side tip portion subjected to particularly high internal pressure may suffer damage such as local breakage and cracking.

JP 2002-192320 A (Patent Reference 2) discloses a die-casting sleeve comprising an inner cylinder fit in an outer cylinder, the inner cylinder coming into contact with a molten metal being constituted by a front member on the injection opening side and a rear member disposed on the rear side of the front member; the front member being formed by a metal material; and the rear member being formed by a ceramic material. Though Patent Reference 2 does not describe the details of the metal material, it describes as only one example an outer cylinder made of hot work die steel SKD61, a front member made of a composite metal material comprising 30% by volume of ceramic particles of silicon nitride dispersed in 70% by volume of an Fe—Ni alloy matrix, and a rear member made of sialon ceramics; the front member and the rear member being shrink-fit into the outer cylinder. It describes that by such a die-casting sleeve, the local damage of the tip portion can be avoided, thereby extending use life, and reducing the number of maintenance steps.

However, because the die-casting sleeve exemplified in Patent Reference 2 uses a material comprising low-thermal-expansion silicon nitride ceramic particles dispersed in an Fe—Ni alloy for the front member, the thermal expansion coefficient of the front member is smaller than that of the outer cylinder (hot work die steel SKD61) and larger than that of the rear member (sialon ceramics), so that shrink fitting is likely loosened between the front member and the rear member of the inner cylinder by temperature elevation during operation, resulting in a gap or a step between them. When an aluminum melt residing in the gap or step is solidified, a plunger tip hits the solidified aluminum during injection, so that the plunger tip and the inner cylinder are damaged. Because the rear member is made of ceramics, it is likely subjected to damage such as breakage, cracking, etc. in a boundary between the front member and the rear member.

Patent Reference 2 further describes that a boundary between the front member and the rear member is preferably located forward an aluminum-melt-supplying opening. For example, the die-casting sleeve shown in FIG. 1 comprises a metal front member extending to a position near the aluminum-melt-supplying opening. Because the metal front member has higher thermal conductivity than that of the ceramic-made rear member, it has lower capability of keeping the temperature of the aluminum melt, so that an aluminum melt is cooled inside the front member on the rear end side (near the supplying opening), likely forming solidified pieces, when the front member extends to a position near the supplying opening, at which the temperature is relatively low during operation. If the solidified pieces were introduced into die-cast products, cold flakes would be formed in the products, making the products defective. The cold flakes are formed when solidified pieces are introduced into products in a sleeve of a die-casting machine. Because the metal front member on the rear end side has a relatively low surface temperature during die-casting, cold flakes are likely formed in the products.

PRIOR ART REFERENCES

Patent Reference 1: JP 7-246449 A
Patent Reference 2: JP 2002-192320 A

OBJECTS OF THE INVENTION

Accordingly, an object of the present invention is to provide a die-casting sleeve comprising a ceramic-made inner cylinder shrink-fit into a metal-made outer cylinder, which can avoid the breakage of a ceramic-made inner cylinder, make less cold flakes, and prevent a plunger tip from being damaged.

Another object of the present invention is to provide a method for producing a die-casting sleeve comprising an inner cylinder constituted by a front member and a rear member having different thermal expansion coefficients, which is shrink-fit into an outer cylinder, such that the front member and the rear member are closely connected without a gap formed during operation.

SUMMARY OF THE INVENTION

As a result of extensive research in view of the above objects, the inventors have found that in a die-casting sleeve comprising an outer cylinder made of a low-thermal-expansion metal material, and an inner cylinder shrink-fit into the outer cylinder, by constituting the inner cylinder by a front member made of a low-thermal-expansion metal material, and a ceramic-made rear member, with the front member adjusted to an optimum length, the breakage of ceramics and the formation of cold flakes can be prevented, while preventing a plunger tip from being damaged. The inventors have further found that in a step of shrink-fitting the inner cylinder into the outer cylinder, by cooling the rear member shrink-fit into the outer cylinder, and then shrink-fitting the front member into a tip portion of the outer cylinder, the front member and the rear member are more closely connected, without a gap formed during operation. The present invention has been completed based on such findings.

Thus, the die-casting sleeve of the present invention comprises an outer cylinder made of a low-thermal-expansion metal material, and an inner cylinder shrink-fit into the outer cylinder;

an outer peripheral surface of the outer cylinder being provided with a flange for fixing the die-casting sleeve to a stationary die block of a die-casting machine;

the inner cylinder being constituted by a front member of a low-thermal-expansion metal material arranged on the injection opening side, and a rear member of silicon-nitride-based ceramics arranged in close contact with a rear end surface of the front member;

the outer cylinder having an average thermal expansion coefficient $\alpha_A$ of $1\times10^{-6}/°$ C. to $5\times10^{-6}/°$ C. between 20° C. and 200° C.;

the front member having an average thermal expansion coefficient $\alpha_B$ of $1\times10^{-6}/°$ C. to $5\times10^{-6}/°$ C. between 20° C. and 200° C.;

the difference between $\alpha_A$ and $\alpha_B$ being $-1\times10^{-6}/°$ C. to $1\times10^{-6}/°$ C.; and the axial length $L_1$ (mm) and inner diameter $D_{in}$ (mm) of the front member, and the distance $L_2$ (mm) from a tip end of the outer cylinder to a rear end of the flange meeting $\frac{1}{3}\times D_{in} \leq L_1 \leq L_2+20$.

$L_1$ (mm), $D_{in}$ (mm) and $L_2$ (mm) preferably meet $\frac{1}{2}\times D_{in} \leq L_1 \leq L_2$.

It is preferable that the low-thermal-expansion metal material forming the outer cylinder is an Fe—Ni—Co—Al—Ti-based alloy comprising 29-35% by mass of Ni, 12-23% by mass of Co, 0.5-1.5% by mass of Al, and 0.8-3% by mass of Ti; and that the low-thermal-expansion metal material forming the front member is an Fe—Ni—Co—Al—Ti-based alloy comprising 29-35% by mass of Ni, 12-23% by mass of Co, 0.5-1.5% by mass of Al, and 0.8-3% by mass of Ti.

It is preferable that the front member has a wear-resistant layer having a thickness of 0.5-5 mm at least on its tip end surface and inner surface; that the wear-resistant layer is made of an Fe—C—Ni—Cr-based alloy comprising 0.2-0.7% by mass of C, 1-7% by mass of Cr, and 1-20% by mass of Ni; and that a surface layer of the wear-resistant layer from the surface to the depth of 0.5 mm comprises 0.2-0.7% by mass of C, 2-7% by mass of Cr, and 1-12% by mass of Ni.

The wear-resistant layer may further contain 0.5-3% by mass of Mo, 0.3-1.5% by mass of V, 8% or less by mass of Co, 0.5% or less by mass of Al, 1.5% or less by mass of Ti, 0.5% or less by mass of Si, and 1.0% or less by mass of Mn.

The wear-resistant layer preferably has a nitrided layer as thick as 150-500 μm on the surface.

The front member preferably has a small-diameter portion in a rear end portion of the outer peripheral surface.

The small-diameter portion is preferably a tapered portion.

The method of the present invention for producing a die-casting sleeve comprises the step of shrink-fitting an inner cylinder into an outer cylinder;

the shrink-fitting step comprising shrink-fitting the rear member into the outer cylinder, cooling them, and then shrink-fitting the front member into a tip portion of the outer cylinder.

Another method of the present invention for producing a die-casting sleeve comprises a step of forming a wear-resistant layer on at least tip end surface and inner surface of the front member, and a step of shrink-fitting the inner cylinder into the outer cylinder;

the shrink-fitting step comprising shrink-fitting the rear member into the outer cylinder, cooling them, and then shrink-fitting the front member into the tip portion of the outer cylinder.

The wear-resistant layer is preferably formed by buildup welding.

The shrink fitting of the front member is preferably conducted by heating an outer surface of a portion of the outer cylinder, into which the front member is to be inserted, inserting the front member into the outer cylinder portion such that it abuts the rear member, cooling a tip-side portion of the outer cylinder portion into which the front member is inserted, and then cooling a rear-side portion of the outer cylinder portion into which the front member is inserted.

EFFECTS OF THE INVENTION

Because in the die-casting sleeve of the present invention, a front member is in close contact with a rear member without a gap formed during operation, the ceramic-made rear member is unlikely broken, and the formation of cold flakes is prevented, so that the die-casting sleeve exhibits excellent durability, suffering less product defects. Further, a plunger tip can be prevented from being damaged.

DESCRIPTION OF THE PREFERRED EMBODIMENTS

The embodiments of the present invention will be explained in detail below referring to the attached drawings without intention of restriction. Explanations of each embodiment are applicable to other embodiments unless otherwise mentioned.

[1] Die-Casting Sleeve (1) Structure

Figure 1A:
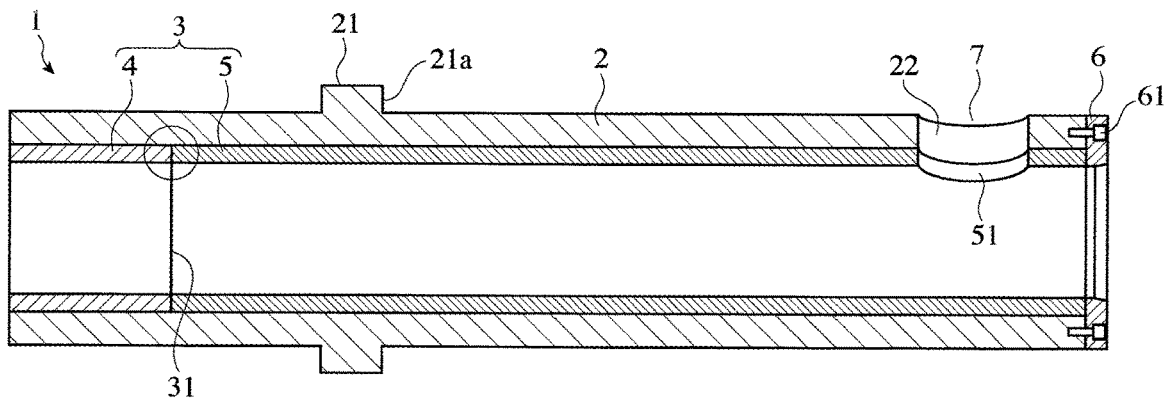
FIG. 1(a) is a schematic cross-sectional view showing an example of the die-casting sleeves of the present invention.
Figure 1B:
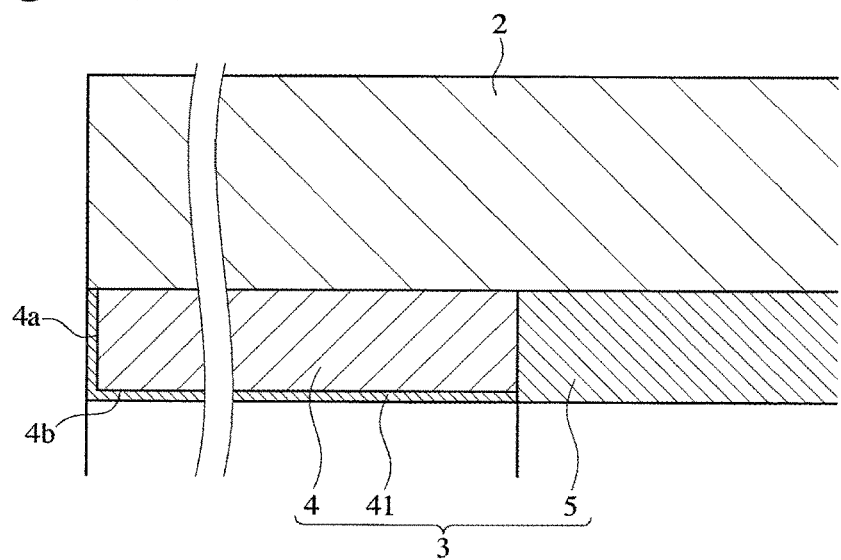
FIG. 1(b) is a schematic cross-sectional view enlargedly showing a tip portion of the die-casting sleeve of FIG. 1(a).
Figure 1C:
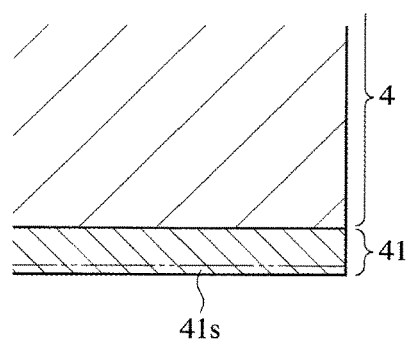
FIG. 1(c) is a schematic cross-sectional view enlargedly showing a surface portion of a front member in the die-casting sleeve of FIG. 1(b).

FIGS. 1(a), 1(b) and 1(c) exemplifies a die-casting sleeve 1. The die-casting sleeve comprises an outer cylinder 2 made of a low-thermal-expansion metal material, and an inner cylinder 3 shrink-fit into the outer cylinder 2; the outer cylinder 2 being provided on the outer peripheral surface with a flange 21 for fixing the die-casting sleeve 1 to a stationary die block of a die-casting machine; the inner cylinder 3 being constituted by a front member 4 arranged on the injection opening side, and a rear member 5 arranged rearward the front member 4 with close contact; the front member 4 being made of a low-thermal-expansion metal material; and the rear member 5 being made of silicon-nitride-based ceramics. The outer cylinder 2 and the front member 4 are preferably made of high-strength, low-thermal-expansion metals having tensile strength of 580 MPa or more. They are preferably made of the same materials. In the present invention, "tip side" means the side of the injection opening, and "rear end side" or "rear side" means an axially opposite side to the injection opening.

Figure 2:
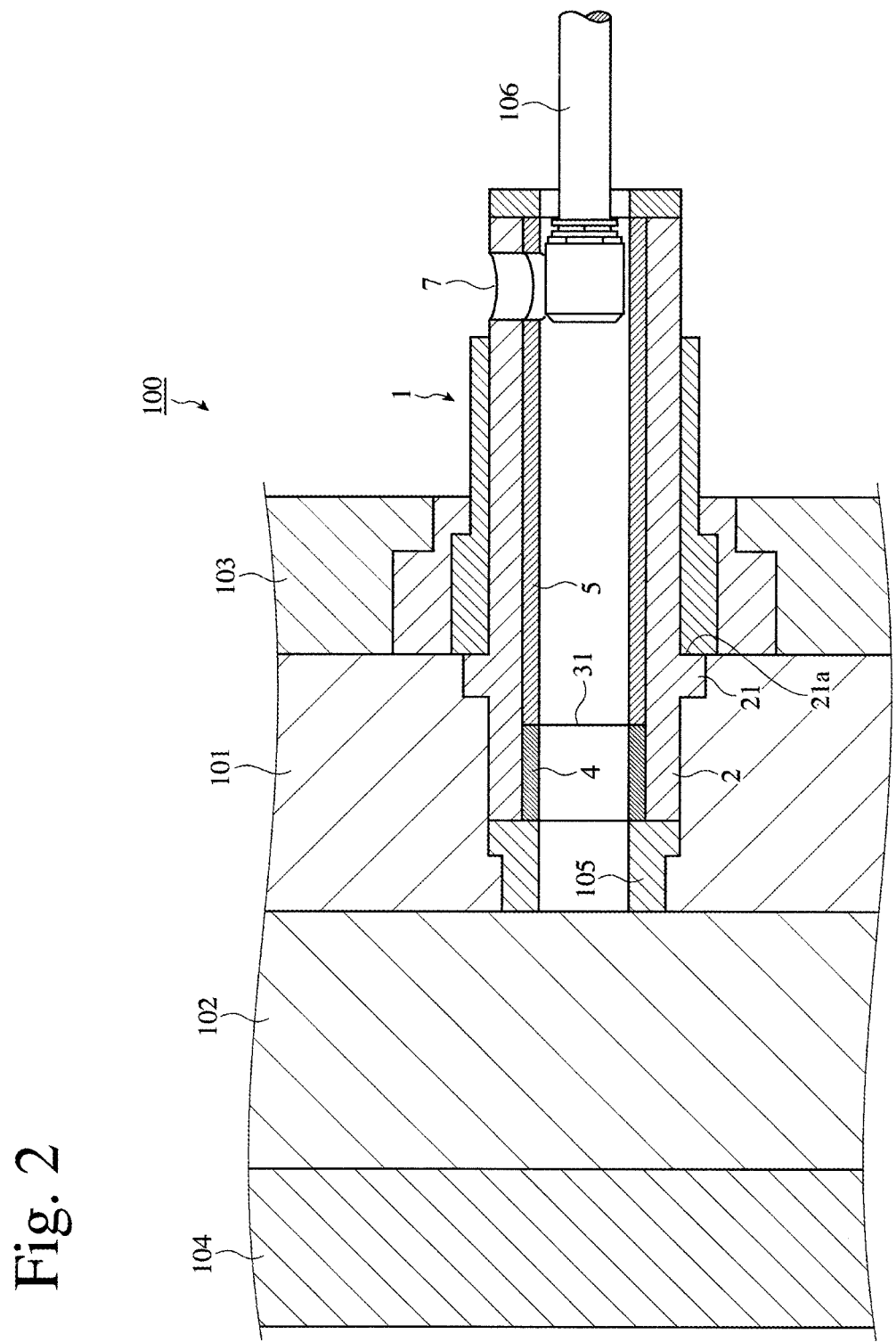
FIG. 2 is a schematic cross-sectional view showing a main portion of a die-casting machine, in which the die-casting sleeve of the present invention is used.

FIG. 2 shows a main portion of a die-casting machine 100, in which the die-casting sleeve 1 of the present invention is used. The die-casting machine 100 has a cavity (not shown) defined by a stationary die block 101 and a movable die block 102, to which the die-casting sleeve 1 is attached to inject a melt of aluminum, etc. from the die-casting sleeve 1 into the cavity by a plunger tip 106 for casting. The stationary die block 101 and the movable die block 102 are supported by a stationary platen 103 and a movable platen 104, respectively, and the movable die block 102 can be moved along the movable platen 104 to take out a cast product. The die-casting sleeve 1 is fixed to the stationary die block 101 by a flange 21 of the outer cylinder 2, with a portion of the die-casting sleeve 1 on the tip side from the flange 21 inserted into the stationary die block 101. A short ring 105 communicating with the cavity is attached to a tip of the die-casting sleeve 1, and a plunger tip 106 for injecting a melt is inserted into the die-casting sleeve 1 on the rear end side.

The outer cylinder 2 has an opening 22 on the rear end side, and the rear member 5 has an opening 51 in alignment with the opening of the outer cylinder 2. The communicating openings 22 and 51 constitute an opening 7 for supplying a melt into the die-casting sleeve 1. The outer cylinder 2 may have, for example, an inner diameter of 90-250 mm, an outer diameter of 150-350 mm, and an axial length of 600-1300 mm. A rear-end ring member 6 is fixed to a rear end of the outer cylinder 2 by bolts 61.

With the tip-side portion of the inner cylinder (front member 4) formed by a low-thermal-expansion metal material, the ceramic-made rear member is not exposed to the injection-opening-side tip end, thereby preventing the damage of the ceramic-made inner cylinder.

Because the rear-side portion of the inner cylinder 3 (rear member 5) is made of silicon-nitride-based ceramics, it has excellent corrosion resistance and wear resistance to a melt of a non-iron metal such as an aluminum alloy, etc., resulting in reduced erosion and wear of the inner surface of the sleeve, a large temperature-keeping function. As a result, solidified pieces are less generated in the inner surface, thereby preventing the formation of cold flake. "Silicon-nitride-based ceramics" are sintered bodies comprising silicon nitride grains or sialon grains containing Al and O partially dissolved in silicon nitride grains, and grain boundaries containing rare earth elements. Namely, the silicon-nitride-based ceramics include silicon nitride ceramics, and sialon ceramics.

(2) Thermal Expansion Coefficient

The outer cylinder 2 made of a low-thermal-expansion metal has an average thermal expansion coefficient $\alpha_A$ of $1 \times 10^{-6}/°$ C. to $5 \times 10^{-6}/°$ C. between 20° C. and 200° C. The outer cylinder 2 preferably has an average thermal expansion coefficient of $5 \times 10^{-6}/°$ C. to $10.5 \times 10^{-6}/°$ C. between 20° C. and 600° C.

The front member 4 of the inner cylinder 3, which is made of a low-thermal-expansion metal, has an average thermal expansion coefficient $\alpha_B$ of $1 \times 10^{-6}/°$ C. to $5 \times 10^{-6}/°$ C. between 20° C. and 200° C. The average thermal expansion coefficient of the front member 4 is preferably $5 \times 10^{-6}/°$ C. to $10.5 \times 10^{-6}/°$ C. between 20° C. and 600° C. The rear member 5 of the inner cylinder 3, which is made of silicon-nitride-based ceramics, for example, has an average thermal expansion coefficient of preferably $4 \times 10^{-6}/°$ C. or less, more preferably $1 \times 10^{-6}/°$ C. to $4 \times 10^{-6}/°$ C., between 20° C. and 200° C., and between 20° C. and 600° C.

Between 20° C. and 200° C., the difference between the average thermal expansion coefficient $\alpha_A$ of the outer cylinder and the average thermal expansion coefficient $\alpha_B$ of the front member is $-1 \times 10^{-6}/°$ C. to $1 \times 10^{-6}/°$ C. With the front member having an average thermal expansion coefficient $\alpha_B$ of $1 \times 10^{-6}/°$ C. to $5 \times 10^{-6}/°$ C. between 20° C. and 200° C., and with the difference between $\alpha_A$ and $\alpha_B$ within $\pm 1 \times 10^{-6}/°$ C., the shrink fitting of the front member 4 of the inner cylinder is unlikely loosened by temperature elevation during operation.

Between 20° C. and 200° C., the difference between the average thermal expansion coefficient $\alpha_C$ of the rear member 5 of the inner cylinder 3 made of silicon-nitride-based ceramics and the average thermal expansion coefficient $\alpha_A$ of the outer cylinder 2, and the difference between the average thermal expansion coefficient $\alpha_C$ of the rear member 5 and the average thermal expansion coefficient $\alpha_B$ of the front member 4 are preferably $-1 \times 10^{-6}/°$ C. to $1 \times 10^{-6}/°$ C. With the front member 4 and the outer cylinder 2 formed by a low-thermal-expansion metal, the difference between the average thermal expansion coefficient $\alpha_C$ of the rear member 5 made of silicon-nitride-based ceramics and the average thermal expansion coefficient $\alpha_A$ of the outer cylinder 2, and the difference between the average thermal expansion coefficient ac of the rear member 5 and the average thermal expansion coefficient $\alpha_B$ of the front member 4 can be within $\pm 1 \times 10^{-6}/°$ C. between 20° C. and 200° C., in a use temperature range (about 200° C., the front member 4 is usually equipped in its outer portion with a water-cooling mechanism.), so that the inner cylinder 3 (including the front member 4 made of a low-thermal-expansion metal and the ceramic-made rear member 5) is strongly fixed to the outer cylinder 2 without loosening, unlikely generating an axial gap and/or a radial step between the front member 4 and the rear member 5 during die-casting. As a result, the resistance-increasing engagement of the plunger tip with aluminum solidified in the gap or step can be prevented, thereby preventing the ceramic-made rear member 5 from being broken in a boundary between the front member 4 and the rear member 5.

With such a composition as to exhibit an average thermal expansion coefficient of less than $1 \times 10^{-6}/°$ C. between 20° C. and 200° C., the low-thermal-expansion metal has low strength and durability, unlikely exhibiting as high strength as 580 MPa or more and such excellent durability as to withstand a repeated load of die-casting. When the outer cylinder 2 is formed by such a low-thermal-expansion metal, excessive tensile stress is generated in the outer cylinder 2 at the time of shrink fitting, resulting in the risk of breakage. With the average thermal expansion coefficient of more than $5 \times 10^{-6}/°$ C. between 20° C. and 200° C., the fitting of the inner cylinder 3 and the outer cylinder 2 is loosened, so that the premature breakage of the rear member 5 and the generation of a gap between the front member 4 and the rear member 5 may occur during die-casting.

When the front member 4 is formed by a low-thermal-expansion metal having an average thermal expansion coefficient of less than $1 \times 10^{-6}/°$ C. between 20° C. and 200° C., it unlikely exhibits as high strength as 580 MPa or more and such excellent durability as to withstand a repeated load of die-casting. Because the average thermal expansion coefficient of more than $5 \times 10^{-6}/°$ C. between 20° C. and 200° C. provides a large difference from the average thermal expansion coefficient of the ceramic-made rear member 5, large difference (step) is generated between the inner diameter of the ceramic-made rear member 5 and the inner diameter of the front member 4, resulting in large sliding resistance of the plunger tip during die-casting.

The outer cylinder 2 made of a low-thermal-expansion metal material preferably has an average thermal expansion coefficient of $5 \times 10^{-6}/°$ C. to $10.5 \times 10^{-6}/°$ C. between 20° C. and 600° C. Because the outer cylinder 2 made of a low-thermal-expansion metal exhibits large thermal expansion between 20° C. (room temperature) and 600° C., a shrink-fitting operation between the outer cylinder 2 and the ceramic-made inner cylinder (rear member 5) can be smoothly conducted at a heating temperature of 550-600° C. during shrink fitting.

When the outer cylinder 2 made of a low-thermal-expansion metal has an average thermal expansion coefficient of less than $5 \times 10^{-6}/°$ C. between 20° C. and 600° C., a shrink-fitting operation with the inner cylinder 3 cannot be smoothly conducted.

The average thermal expansion coefficients (corresponding to average linear thermal expansion coefficients or average linear thermal expansion ratios) of the outer cylinder and the front member both made of a low-thermal-expansion metal material are measured according to "Method of Measuring Linear Thermal Expansion Coefficients of Metal Materials" of JIS Z 2285-2003. The average thermal expansion coefficient of the ceramic-made inner cylinder is measured according to "Measurement of Thermal Expansion of Fine Ceramics by Thermomechanical Analysis" of JIS R 1618-2002. The measurement of an average thermal expansion coefficient is conducted by using a differential-expansion thermomechanical analyzer.

(3) Materials (a) Outer Cylinder

The low-thermal-expansion metal material forming the outer cylinder is preferably an Fe—Ni—Co—Al—Ti-based alloy comprising 29-35% by mass of Ni, 12-23% by mass of Co, 0.5-1.5% by mass of Al, and 0.8-3% by mass of Ti, the balance being Fe and inevitable impurities. Using such a material, the outer cylinder can have increased strength. An Fe—Ni—Co—Al—Ti-based alloy comprising 30-35% by mass of Ni, 12-17% by mass of Co, 0.5-1.5% by mass of Al, and 1.5-3% by mass of Ti, the balance being Fe and inevitable impurities, is more preferable. Al and Ti are precipitation-strengthening elements, contributing to increase in strength (for example, tensile strength). Apart from Al and Ti, Nb may be used as a precipitation-strengthening element. Nb may be contained together with Al and Ti. Nb is preferably 2-5% by mass.

Formed by the Fe—Ni—Co—Al—Ti-based alloy and heat-treated, the outer cylinder has high strength. A heat treatment may be, for example, a combination of a solid-solution treatment (900-1000° C.) and a subsequent aging treatment (580-750° C.). For example, the outer cylinder preferably has tensile strength of 500 MPa or more at 300° C. and 400° C. With such high-temperature strength, the ceramic-made rear member can be sufficiently protected from internal stress generated by injecting a melt into the die-casting sleeve 1. Also, the outer cylinder preferably has elongation of 15% or more (particularly 20% or more), thermal conductivity of 20 W/m·K or less, and Young's modulus of 130 GPa or more at room temperature.

(b) Front Member of Inner Cylinder

The low-thermal-expansion metal material forming the front member 4 of the inner cylinder 3 is preferably the same material as the low-thermal-expansion metal material forming the outer cylinder, namely an Fe—Ni—Co—Al—Ti-based alloy comprising 29-35% by mass of Ni, 12-23% by mass of Co, 0.5-1.5% by mass of Al, and 0.8-3% by mass of Ti, the balance being Fe and inevitable impurities. An Fe—Ni—Co—Al—Ti-based alloy comprising 30-35% by mass of Ni, 12-17% by mass of Co, 0.5-1.5% by mass of Al, and 1.5-3% by mass of Ti, the balance being Fe and inevitable impurities, is more preferable.

The front member 4 of the inner cylinder 3 preferably has a wear-resistant layer 41 on at least the tip end surface 4a and the inner surface 4b. The wear-resistant layer 41 is preferably made of an Fe—C—Ni—Cr-based alloy comprising 0.2-0.7% by mass of C, 1-7% by mass of Cr, and 1-20% by mass of Ni, the balance being Fe and inevitable impurities. The Fe—C—Ni—Cr-based alloy forming the wear-resistant layer 41 has high wear resistance because of finely dispersed carbide, and excellent erosion resistance because carbide dispersed in the alloy is not reactive with a molten non-iron metal. This Fe—C—Ni—Cr-based alloy may further contain 0.5-3% by mass of Mo, 0.3-1.5% by mass of V, 8% or less by mass of Co, 0.5% or less by mass of Al, 1.5% or less by mass of Ti, 0.5% or less by mass of Si, and 1.0% or less by mass of Mn, and further 0.04% or less by mass of P, and 0.03% or less by mass of S. The Fe—C—Ni—Cr-based alloy may further contain 0.1-4% by mass of W. Because metal components of the front member 4 (low-thermal-expansion metal material) are diffused into the wear-resistant layer 41 as described later, the metal composition of the wear-resistant layer 41 is not uniform in a thickness direction. Accordingly, the metal composition of the wear-resistant layer 41 herein means the overall composition of the wear-resistant layer 41.

The wear-resistant layer 41 is preferably formed by metallurgical bonding, by which the materials of the front member 4 and the wear-resistant layer 41 are diffused to each other. The thickness of the wear-resistant layer 41 is preferably 0.5-5 mm, more preferably 2-3 mm. When it is less than 0.5 mm, the wear-resistant layer 41 unlikely has sufficient corrosion resistance. Because the wear-resistant layer 41 is made of a material having a larger thermal expansion coefficient than that of the front member 4, the front member 4 as thick as more than 5 mm exhibits large thermal expansion as a whole, resulting in large difference in thermal expansion between the wear-resistant layer 41 and the rear member 5 made of silicon-nitride-based ceramics. As a result, the shrink-fitting strength of the rear member 5 may decrease during use. Because a melt of a non-iron metal such as an aluminum alloy does not come into direct contact with the tip end and inner surfaces of the front member 4 and the inner surface of the rear member 5 in the die-casting sleeve of the present invention, the wear-resistant layer 41 need only be formed on at least the tip end surface 4a and inner surface 4b of the front member 4, but the wear-resistant layer may be formed on the rear end and outer peripheral surfaces.

A portion of the wear-resistant layer 41 up to the depth of 0.5 mm from the surface, namely a surface layer 41s of the wear-resistant layer 41 [see FIG. 1(c)], preferably contains 0.2-0.7% by mass of C, 2-7% by mass of Cr, and 1-12% by mass of Ni. Because the wear-resistant layer 41 is bonded to the front member 4 by a method by which their materials are mutually diffused, metal components in the front member 4 are largely diffused into the wear-resistant layer 41, and metal components in the wear-resistant layer 41 are largely diffused into the front member 4, in a bonding region of the front member 4 and the wear-resistant layer 41. However, the surface layer 41s of the wear-resistant layer 41 most distant from the bonding region contains less metal components diffused from the front member 4. With the amounts of C, Cr and Ni in the surface layer 41s within the above ranges, a surface of the wear-resistant layer 41 has better corrosion resistance and wear resistance.

With less than 0.2% by mass of C, the surface layer 41s has low corrosion resistance, providing the front member with a shorter life by premature erosion. On the other hand, more than 0.7% by mass of C reduces toughness, easily causing cracking and peeling. With less than 2% by mass of Cr, the surface layer 41s has low corrosion resistance, providing the front member with a shorter life by premature erosion. On the other hand, more than 7% by mass of Cr reduces toughness, easily causing cracking and peeling. With less than 1% by mass of Ni, the surface layer 41s has low heat shock resistance, likely suffering heat cracking. On the other hand, more than 12% by mass of Ni reduces corrosion resistance, resulting in low wear resistance by premature erosion and thus premature wear, leading to a shorter life of the front member. It further reduces machinability, resulting in a higher production cost. More preferable amounts of C, Cr and Ni in the surface layer 41s are 0.3-0.5% by mass, 3-5% by mass, and 2-8% by mass, respectively.

The wear-resistant layer 41 preferably has a nitrided layer (not shown) as thick as 150-500 μm on the surface. Because the wear-resistant layer 41 made of an Fe—C—Ni—Cr-based alloy contains Cr having strong affinity for nitrogen, nitrogen is easily diffused into the alloy, thereby forming a nitrided layer containing a large amount of nitrides. Because of iron nitride formed on the outermost surface, the nitrided layer is not reactive with a molten metal. For the reasons described above, with a structure having the wear-resistant layer made of the Fe—C—Ni—Cr-based alloy having excellent erosion resistance, and the nitrided layer formed on the outermost surface coming into contact with a molten non-iron metal, erosion due to the reaction with the molten non-iron metal can be avoided. Even if part of the nitrided layer were worn off during operation, the wear-resistant layer of the Fe—C—Ni—Cr-based alloy having high erosion resistance is resistant to erosion with an intruding molten metal, so that rapid erosion can be prevented. The nitrided layer can be formed by subjecting a surface of the wear-resistant layer 41 to a nitriding treatment such as sulphonitriding, nitrocarburizing, gas nitriding, soft gas nitriding, plasma nitriding, etc. Among them, sulphonitriding preferably improves lubrication because of S, resulting in reduced sliding resistance with the plunger tip.

(c) Rear Member of Inner Cylinder

The rear member of the inner cylinder is made of silicon-nitride-based ceramics. As described above, the silicon-nitride-based ceramics, which are in the form of a sintered body comprising silicon nitride grains or sialon grains containing Al and O partially dissolved in silicon nitride grains, and grain boundaries containing rare earth elements, include silicon nitride ceramics and sialon ceramics. The silicon-nitride-based ceramics have an average thermal expansion coefficient of $1 \times 10^{-6}/°$ C. to $4 \times 10^{-6}/°$ C. between 20° C. and 200° C., and suffer little deformation during operation, exhibiting high sealability. Accordingly, they prevent the intrusion of a metal melt, so that galling can be avoided. Further, these ceramics have excellent corrosion resistance and wear resistance to a melt of a non-iron metal such as an aluminum alloy, etc., the erosion and wear of an inner surface of the injection sleeve can be reduced.

(4) Structures of Front and Rear Members

Figure 3:
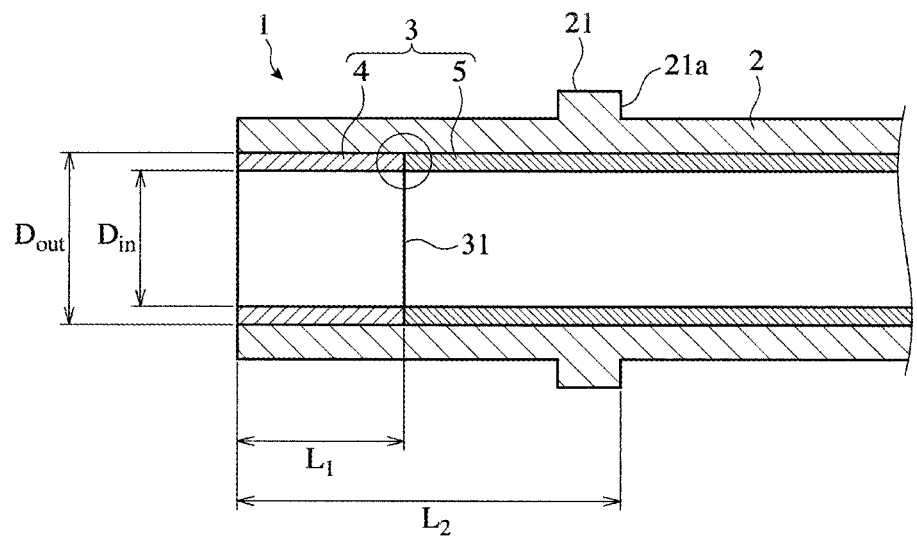
FIG. 3 is a partial cross-sectional view showing an example of the die-casting sleeves of the present invention.

The axial length $L_1$ (mm) and inner diameter $D_{in}$ (mm) of the front member 4, and the distance $L_2$ (mm) from a tip end of the outer cylinder 2 to a rear end 21a of the flange 21 meet the formula of $\frac{1}{3} \times D_{in} \leq L_1 \leq L_2 + 20$ (see FIG. 3). When the axial length $L_1$ of the front member 4 is less than $\frac{1}{3} \times D_{in}$, the shrink-fitting force of the outer cylinder 2 to the front member 4 is so low that the front member 4 may move axially during operation, resulting in a gap between the front member 4 and the rear member 5, and that a tip portion (injection opening side) of the ceramic-made rear member 5 may be damaged. Also, when the axial length $L_1$ of the front member 4 is less than $\frac{1}{3} \times D_{in}$, mechanical shock is given from the short ring 105 to a connecting surface 31 of the front member 4 to the rear member 5 when the die-casting sleeve of the present invention is assembled to a die-casting machine, so that the inner-surface end portion of the rear member 5 may be broken. When the axial length $L_1$ of the front member 4 is more than $(L_2+20)$ mm, the rear end of the front member 4 is positioned rearward (supply opening side) from the stationary die block 101, the temperature of the rear-end-side inner surface of the front member 4 is not easily elevated. As a result, solidified pieces are likely generated on the rear-end-side inner surface of the front member 4, and enter die-cast products, likely forming defects such as cold flake in the products.

With the flange 21 positioned inside the stationary die block 101 as shown in FIG. 2, substantially all of the front member 4 is positioned inside the stationary die block 101 and the stationary platen 103, when the axial length $L_1$ of the front member 4 is $(L_2+20)$ mm or less. Because the temperature is relatively high during operation in the stationary die block 101 and a portion of the stationary platen 103 near the stationary die block 101, the rear-end-side inner surface of the front member 4 is subject to a high temperature when the axial length $L_1$ of the front member 4 is ($L_2$+20) mm or less, preventing cold flake from being formed in the products. The lower limit of the length $L_1$ of the front member 4 is preferably $½×D_{in}$, more preferably $⅔×D_{in}$. The upper limit of the length $L_1$ of the front member 4 is preferably $L_2$ (mm), more preferably ($L_2$−20) (mm).

Figure 4A:
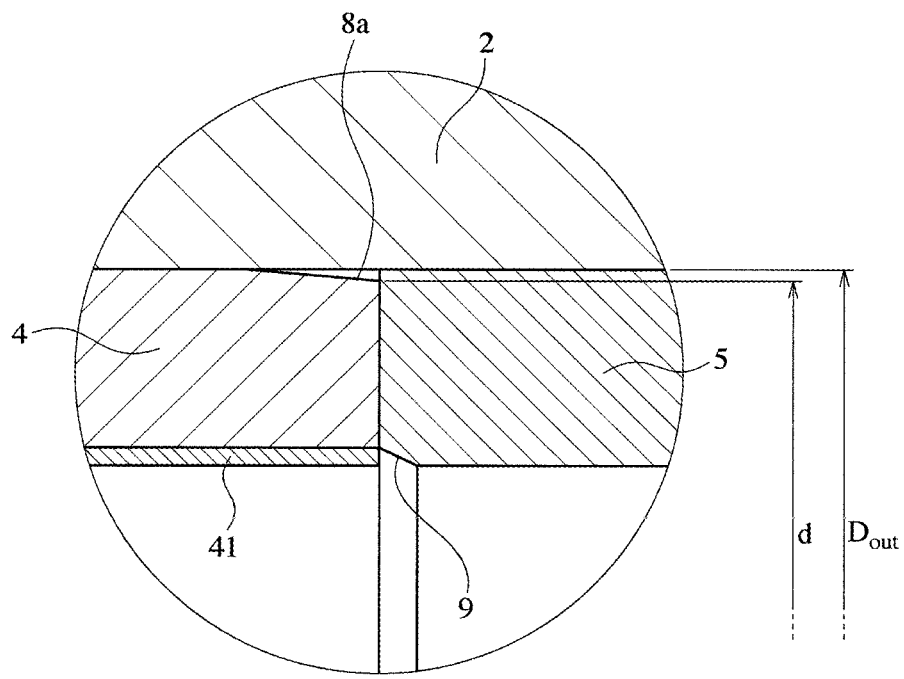
FIG. 4(a) is a cross-sectional view showing an example of a connecting portion of a front member and a rear member in the die-casting sleeve of the present invention.
Figure 4B:
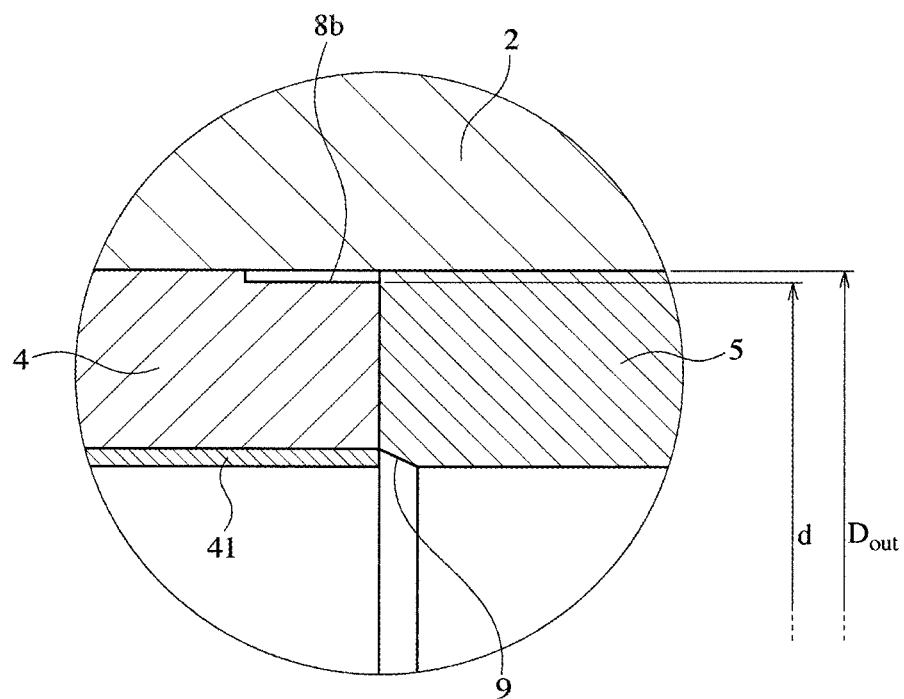
FIG. 4(b) is a cross-sectional view showing another example of a connecting portion of a front member and a rear member in the die-casting sleeve of the present invention.

The front member preferably has a small-diameter portion in a rear end portion of the outer peripheral surface. The small-diameter portion may be a tapered portion 8a formed on the rear-end-side outer peripheral surface of the front member as shown in FIG. 4(*a*), or a step 8b formed on the rear-end-side outer peripheral surface of the front member as shown in FIG. 4(*b*). The axial length of the small-diameter portion is preferably 2-20% of the axial length of the front member, and a ratio d/D of the minimum diameter d of the small-diameter portion to the outer diameter D of the front member is preferably $0.98 ≤ d/D < 1$. Such a small-diameter portion in the rear end portion of outer peripheral surface of the front member, which provides a space with a portion of the outer cylinder opposing the small-diameter portion, prevents internal pressure from being applied to this portion of the outer cylinder, even when the front member is expanded during die-casting. As a result, shrink fitting can be prevented from loosening in a tip portion of the rear member made of silicon-nitride-based ceramics, thereby avoiding the tip portion of ceramics from being broken.

The tip-side inner surface of the rear member preferably has a chamfered portion 9. The chamfered portion 9 preferably has an axial length of 1-4 mm, and an angle of 5-50° to the inner surface. With such a chamfered portion on the tip-side inner surface of the rear member, the breakage of the tip-side corner of the ceramic-made rear member can be prevented. The chamfered portion 9 more preferably has a length of 1-2 mm and an angle of 20-30°.

In the die-casting sleeve of the present invention comprising an outer cylinder 2 and an inner cylinder 3 (a front member 4 and a rear member 5), the loosening of the front member and the generation of a gap or a step between the front member 4 and the rear member 5 during operation are prevented by properly selecting constituent members, but water cooling with cooling-water paths in the outer cylinder can more surely prevent the loosening of shrink fitting, and the generation of a gap or a step between the front member 4 and the rear member 5. Particularly because the front member 4 is positioned inside the stationary die block, proper water cooling at a flow rate of, for example, 1-30 L/min is effective, with cooling-water paths inside the outer cylinder around the front member 4.

[2] Production Method of Die-Casting Sleeve

The method of the present invention for producing a die-casting sleeve comprises a step of shrink-fitting the inner cylinder comprising a front member made of a low-thermal-expansion metal material and a rear member made of silicon-nitride-based ceramics into the outer cylinder made of a low-thermal-expansion metal material; the shrink fitting being conducted by shrink-fitting the rear member into the outer cylinder, cooling them, and then shrink-fitting the front member into a tip portion of the outer cylinder.

In the die-casting sleeve of the present invention, the front member having the wear-resistant layer on at least the tip end and inner surfaces is formed by bonding the wear-resistant layer to at least the tip end and inner surfaces of the front member.

(a) Step of Forming Wear-Resistant Layer

The wear-resistant layer 41 is formed by buildup-welding an alloy such as tool alloy steel, for example, SKD61, etc. to at least tip end surface 4a and inner surface 4b of the front member made 4 of a low-thermal-expansion metal material. In this case, it is preferable to use a bonding method by which the materials of the front member 4 and the wear-resistant layer 41 are mutually diffused, namely metallurgical bonding. With the materials of the front member 4 and the wear-resistant layer 41 mutually diffused, the wear-resistant layer 41 can be bonded to the front member 4 with high strength. Such bonding methods include buildup welding, spraying, etc. The buildup welding is particularly preferable, because it forms a thicker layer than spraying, with metallurgical bonding between the front member 4 and the buildup-welded layer, thereby providing a wear-resistant layer 41 having high erosion resistance.

When the wear-resistant layer is formed by buildup welding, the desired thickness may be achieved by one buildup-welding step, but preferably by two steps or more of buildup welding. When buildup welding is conducted by two steps, for example, a first buildup-welding step forms a half thickness, and a second buildup-welding step forms a remaining thickness to complete a wear-resistant layer having a desired thickness. Specifically, it is preferable to form a wear-resistant layer of 1.5-2.5 mm by the first buildup welding, and a wear-resistant layer of 1.5-2.5 mm by the second buildup welding. After the first buildup welding, about 0.1-0.5 mm of a wear-resistant layer may be removed from the surface by machining, and then the second buildup welding may be conducted. After the second buildup welding, a surface of the wear-resistant layer is machined to have the desired inner diameter of the front member. In the case of two steps or more of buildup welding, even when metal components in the front member are diffused into the wear-resistant layer in the first buildup welding, the percentages of such metal components can be reduced by the second buildup welding, thereby providing an outermost surface of the wear-resistant layer with enough erosion resistance.

After the wear-resistant layer is formed, a nitrided layer may be formed on its surface. The nitrided layer may be formed on the wear-resistant layer by a nitriding treatment such as sulphonitriding, nitrocarburizing, gas nitriding, soft gas nitriding, plasma nitriding, etc. Among them, sulphonitriding preferably improves lubrication because of S, resulting in reduced sliding resistance with the plunger tip.

(b) Step of Shrink-Fitting

Figure 5:
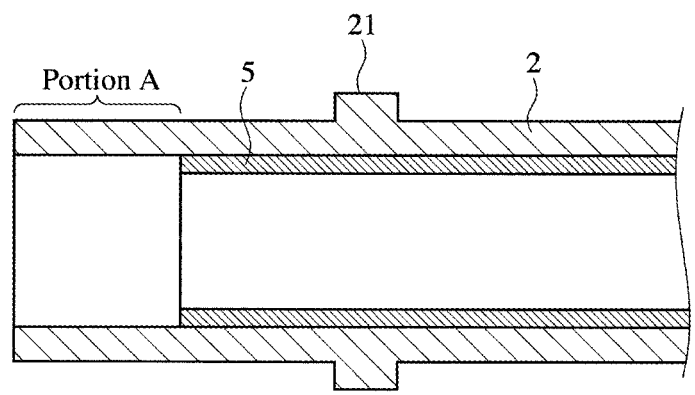
FIG. 5 is a partial cross-sectional view showing a portion A of the outer cylinder in the die-casting sleeve, which is heated for shrink-fitting the front member in the production method of the present invention.

After the rear member is shrink-fit into the outer cylinder and cooled, the front member is preferably shrink-fit into a tip portion of the outer cylinder. The shrink fitting of the front member is preferably conducted by heating an outer surface of a portion A of the outer cylinder 2 shown in FIG. 5, into which the front member (not shown) is to be inserted, inserting the front member until it abuts the rear member 5, cooling a tip side of the portion A, and then cooling a rear side of the portion A. With the tip side of the portion A first cooled, and the rear side of the portion A subsequently cooled, the front member is fit first in the tip side and then in the rear-end side, so that axial compression stress can be applied to abutting surfaces of the ceramic-made rear member and the front member, resulting in close contact of the front member with the rear member. To cool the tip side and rear side of the portion A, into which the front member is inserted, with different timing, for example, the front member is inserted into the portion A of the outer cylinder after heating its outer surface by a band heater; power supply to the band heater is shut off; and the band heater is then moved toward the rear side by a half distance of the front member.

The shrink fitting of the rear member (inner ceramic cylinder) into the outer cylinder is preferably conducted at a shrink-fitting ratio of 1/1000 to 2/1000 at a shrink-fitting temperature of 550-650° C. The shrink fitting of the front member into the outer cylinder is preferably conducted at a shrink-fitting ratio of 0/1000 to 1/1000 at a shrink-fitting temperature of 400-450° C. The shrink-fitting ratio is more preferably 0.05/1000 to 0.5/1000. The shrink-fitting ratio is expressed by shrink-fitting ratio=(d1−D2)/D2, wherein d1 represents the outer diameter of the inner cylinder before shrink fitting, and D2 represents the inner diameter of the outer cylinder before shrink fitting.

The present invention will be explained in more detail by Examples without intention of restriction.

EXAMPLE 1

An outer cylinder and an inner cylinder were prepared, shrink-fit and machined as described below, to produce the die-casting sleeve 1 of the present invention shown in FIGS. 1(a), 1(b) and 1(c).

(1) Preparation of Outer Cylinder and Inner Cylinder (a) Outer Cylinder

A cylindrical outer cylinder having an outer diameter of 270 mm, an inner diameter of 160 mm and a length of 1000 mm, which had a flange of 300 mm in diameter and 35 mm in thickness (axial length) at a position of 400 mm from the tip, was formed by a high-strength, low-thermal-expansion metal comprising 32.6% by mass of Ni, 14.9% by mass of Co, 0.8% by mass of Al, 2.3% by mass of Ti, and 0.04% by mass of C, the balance being Fe and inevitable impurities. The distance $L_2$ from the tip of this outer cylinder to the rear end of the flange was 435 mm. The outer cylinder was subjected to a solid-solution treatment at 850° C. for 2 hours, air-cooling, and then an aging treatment at 600° C. for 24 hours. This outer cylinder had tensile strength of 1200 MPa, and an average thermal expansion coefficient of $3.2 \times 10^{-6}$/° C. between 20° C. and 200° C. and $9.5 \times 10^{-6}$/° C. between 20° C. and 600° C.

(b) Front Member of Inner Cylinder

A high-strength, low-thermal-expansion metal material comprising 32.6% by mass of Ni, 14.9% by mass of Co, 0.8% by mass of Al, 2.3% by mass of Ti, and 0.04% by mass of C, the balance being Fe and inevitable impurities, was prepared, and 1.5-mm-thick SKD61 was buildup-welded twice on its tip-end and inner surfaces, to form a wear-resistant layer having a total thickness of 3.0 mm. After the buildup-welded sample was subjected to an aging treatment at 600° C. for 10 hours, a surface of the buildup-welded layer was machined to the depth of about 0.5 mm, to obtain a cylindrical member having an outer diameter of 160 mm, an inner diameter of 130 mm and a length of 170 mm. With a composition-analyzing sample of the buildup-welded layer taken from the rear-end side of the cylindrical member, a cylindrical member having an outer diameter of 160 mm, an inner diameter $D_{in}$ of 130 mm and an axial length $L_1$ of 150 mm was finally obtained. This member was provided on the rear-end-side outer peripheral surface with a tapered portion having a length of 10 mm and inclined by 5° to its axis, to obtain a front member. This front member had tensile strength of 1200 MPa, and an average thermal expansion coefficient of $3.2 \times 10^{-6}$/° C. between 20° C. and 200° C. and $9.5 \times 10^{-6}$/° C. between 20° C. and 600° C.

(c) Rear Member of Inner Cylinder

A material powder comprising 87% by mass of $Si_3N_4$, 6% by mass of $Y_2O_3$, 4% by mass of $Al_2O_3$, and 3% by mass of a 21R solid solution was wet-blended and spray-dried, and then molded by cold isostatic pressing (CIP) under a pressure of 100 MPa to obtain a cylindrical green body. This green body was sintered at 1750° C. in a nitrogen atmosphere, to obtain a cylindrical sialon ceramic. This rear member had an average thermal expansion coefficient of $2 \times 10^{-6}$/° C. between 20° C. and 200° C. and $2 \times 10^{-6}$/° C. between 20° C. and 600° C. The resultant cylindrical sialon ceramic was surface-machined, to obtain an inner cylinder having an outer diameter of 160 mm, an inner diameter of 130 mm and a length of 850 mm.

(2) Shrink Fitting

The rear member 5 was first shrink-fit into the outer cylinder 2 at a shrink-fitting ratio of 1/1000 and a shrink-fitting temperature of 650° C. The front member 4 was then shrink-fit into the outer cylinder 2 at a shrink-fitting ratio of 0.05/1000 and a shrink-fitting temperature of 250° C. The shrink fitting of the front member 4 was conducted by heating an outer surface of a portion of the outer cylinder, into which the front member 4 was to be inserted, by a 150-mm-long band heater, inserting the front member 4 until it was abutted to the rear member 5, shutting off power supply to the band heater, and moving the band heater by a half length (75 mm) of the front member 4 toward the rear end side. By such shrink-fitting, the tip side of the front member 4 was first cooled to be fit, and the rear-end side of the front member 4 was then cooled to be fit, so that the end surface of the front member 4 was strongly abutted to the end surface of the rear member 5.

(3) Machining

After shrink fitting, the inner, outer and rear end surfaces were finish-machined, and a rear end ring (length: 50 mm) was attached and fixed by bolts.

(4) Composition Analysis of Front Member

The composition of the wear-resistant layer of the front member was determined by analyzing dust A obtained by cutting an inner surface of the composition-analyzing sample of the buildup-welded layer to the depth of 0.5 mm by a lathe, and dust B obtained by cutting the inner surface to the depth of 2 mm by a lathe. The compositions of the dust A and the dust B respectively represent those of surface and inner layers of the wear-resistant layer. The compositions of carbon and sulfur were analyzed by a carbon/sulfur analyzer (EMIA-320V2 available from HORIBA, Ltd.), and those of metal components were analyzed by a high-frequency inductively coupled plasma atomic emission spectroscope (ICPS-8100 available from Shimadzu Corporation). The measured compositions of surface and overall portions of the wear-resistant layer are shown in Table 1, together with those of the high-strength, low-thermal-expansion metal used for the front member and SKD61 used for the wear-resistant layer.

TABLE 1

| Compo-sition | Front Member[1] (% by mass) | SKD61 (% by mass) | Wear-Resistant Layer (% by mass) | |
|---|---|---|---|---|
| | | | Surface[2] | Overall[3] |
| C | 0.04 | 0.39 | 0.28 | 0.34 |
| Si | — | 0.8 | 0.2 | 0.19 |
| Mn | — | 0.4 | 0.59 | 0.52 |
| S | — | 0.01 | <0.001 | <0.001 |
| Ni | 32.6 | — | 7.85 | 10.1 |
| Cr | — | 5.15 | 2.84 | 2.8 |
| Mo | — | 1.4 | 1.24 | 1.12 |
| V | — | 0.8 | 0.67 | 0.64 |
| Co | 14.9 | — | 3.92 | 5.15 |
| Al | 0.8 | — | 0.17 | 0.18 |

TABLE 1-continued

| Compo-sition | Front Member[1] (% by mass) | SKD61 (% by mass) | Wear-Resistant Layer (% by mass) | |
|---|---|---|---|---|
| | | | Surface[2] | Overall[3] |
| Ti | 2.3 | — | 0.5 | 0.6 |
| Fe | Bal. | Bal. | Bal. | Bal. |

Note:
[1]The composition of the high-strength, low-thermal-expansion metal.
[2]A portion of the wear-resistant layer up to the depth of 0.5 mm from the surface.
[3]A portion of the wear-resistant layer up to the depth of 2.0 mm from the surface.

The die-casting sleeve 1 having the above structure was mounted to an melt injection apparatus of a lateral-type die-casting machine having a clamping force of 1,650 tons, and aluminum alloy automobile parts each 20 kg were die-cast using a plunger tip of SKD61 sliding inside the sleeve. As a result, no cracking and damage were observed in the front member of the inner cylinder and the rear member, and the die-casting sleeve did not cause any defects such as cold flakes, confirming stable injection.

What is claimed is:

1. A die-casting sleeve comprising an outer cylinder made of a low-thermal-expansion metal material, and an inner cylinder shrink-fit into said outer cylinder;
    said outer cylinder being provided on its outer peripheral surface with a flange for fixing the die-casting sleeve to a stationary die block of a die-casting machine;
    said inner cylinder being constituted by a front member of a low-thermal-expansion metal material arranged on the injection opening side, and a rear member of silicon-nitride-based ceramics arranged in contact with a rear end surface of said front member;
    said outer cylinder having an average thermal expansion coefficient $\alpha_A$ of $1 \times 10^{-6}/°$ C. to $5 \times 10^{-6}/°$ C. between 20° C. and 200° C.;
    said front member having an average thermal expansion coefficient $\alpha_B$ of $1 \times 10^{-6}/°$ C. to $5 \times 10^{-6}/°$ C. between 20° C. and 200° C.;
    the difference between $\alpha_A$ and $\alpha_B$ being $-1 \times 10^{-6}/°$ C. to $1 \times 10^{-6}/°$ C.; and
    the axial length $L_1$ (mm) and inner diameter $D_{in}$ (mm) of said front member, and the distance $L_2$ (mm) from a tip end of said outer cylinder to a rear end of said flange meeting $1/3 \times D_{in} \leq L_1 \leq L_2 + 20$.

2. The die-casting sleeve according to claim 1, wherein $L_1$ (mm), $D_{in}$ (mm) and $L_2$ (mm) meet $1/2 \times D_{in} \leq L_1 \leq L_2$.

3. The die-casting sleeve according to claim 1, wherein the low-thermal-expansion metal material forming said outer cylinder is an Fe—Ni—Co—Al—Ti-based alloy comprising 29-35% by mass of Ni, 12-23% by mass of Co, 0.5-1.5% by mass of Al, and 0.8-3% by mass of Ti, the balance being Fe and inevitable impurities; and
    the low-thermal-expansion metal material forming said front member is an Fe—Ni—Co—Al—Ti-based alloy comprising 29-35% by mass of Ni, 12-23% by mass of Co, 0.5-1.5% by mass of Al, and 0.8-3% by mass of Ti, the balance being Fe and inevitable impurities.

4. The die-casting sleeve according to claim 1, wherein said front member has a wear-resistant layer having a thickness of 0.5-5 mm at least on its tip end surface and inner surface;
    said wear-resistant layer is made of an Fe—C—Ni—Cr-based alloy comprising 0.2-0.7% by mass of C, 1-7% by mass of Cr, and 1-20% by mass of Ni, the balance being Fe and inevitable impurities; and
    a surface layer of said wear-resistant layer from the surface to the depth of 0.5 mm comprises 0.2-0.7% by mass of C, 2-7% by mass of Cr, and 1-12% by mass of Ni.

5. The die-casting sleeve according to claim 4, wherein said wear-resistant layer further contains 0.5-3% by mass of Mo, 0.3-1.5% by mass of V, 8% or less by mass of Co, 0.5% or less by mass of Al, 1.5% or less by mass of Ti, 0.5% or less by mass of Si, and 1.0% or less by mass of Mn.

6. The die-casting sleeve according to claim 4, wherein said wear-resistant layer has a nitrided layer as thick as 150-500 μm on the surface.

7. The die-casting sleeve according to claim 1, wherein said front member has a tapered portion formed on a rear-end-side outer peripheral surface of the front member, or a step formed on the rear-end-side outer peripheral surface of the front member.

8. The die-casting sleeve according to claim 7, wherein said front member has the tapered portion.

9. A method for producing the die-casting sleeve recited in claim 1 comprising a step of shrink-fitting said inner cylinder into said outer cylinder;
    said shrink-fitting step comprising shrink-fitting said rear member into the outer cylinder, cooling them, and then shrink-fitting said front member into a tip portion of said outer cylinder.

10. A method for producing the die-casting sleeve according to claim 4, wherein said method comprises a step of forming said wear-resistant layer on at least the tip end surface and the inner surface of said front member, and a step of shrink-fitting said inner cylinder into said outer cylinder;
    said shrink-fitting step comprising shrink-fitting said rear member into said outer cylinder, cooling them, and then shrink-fitting said front member into a tip portion of said outer cylinder.

11. The method for producing the die-casting sleeve according to claim 10, wherein said wear-resistant layer is formed by buildup welding.

12. The method for producing the die-casting sleeve according to claim 9, wherein the shrink fitting of said front member is conducted by heating an outer surface of a portion of said outer cylinder, into which said front member is to be inserted, inserting said front member into said outer cylinder portion such that it abuts said rear member, cooling a tip-side portion of said outer cylinder portion into which said front member is inserted, and then cooling a rear-side portion of said outer cylinder portion into which said front member is inserted.

* * * * *